A. C. CHISHOLM.
FABRIC MEASURING DEVICE.
APPLICATION FILED APR. 26, 1915.
1,166,969.
Patented Jan. 4, 1916.
2 SHEETS—SHEET 1.
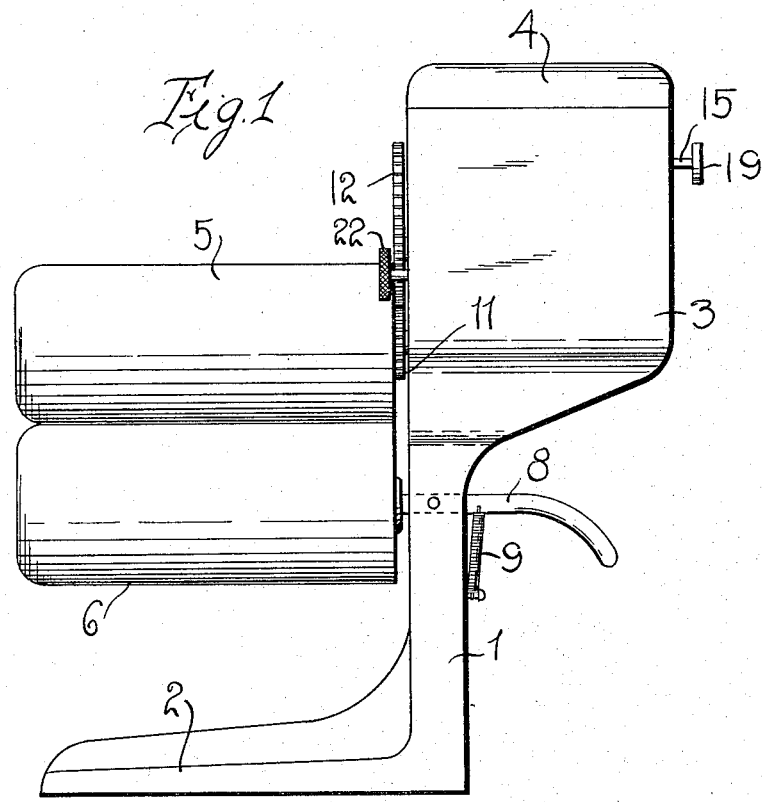
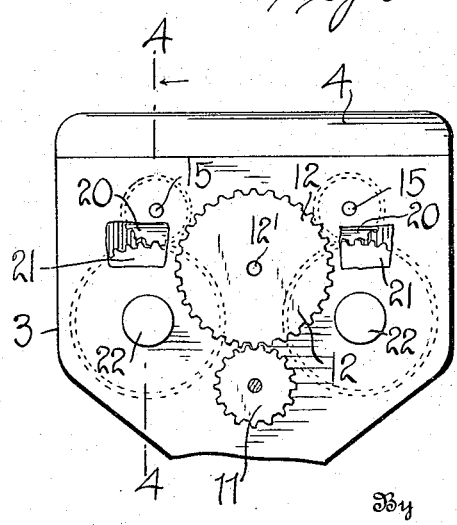
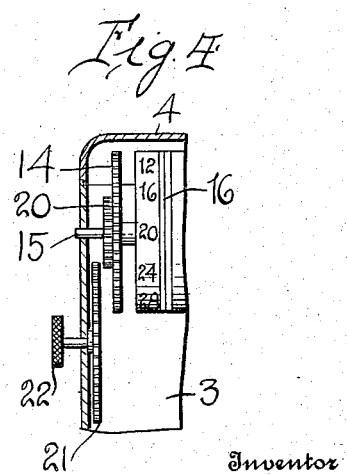
Inventor
A. C. CHISHOLM
By Watson E. Coleman
Attorney A. C. CHISHOLM.
FABRIC MEASURING DEVICE.
APPLICATION FILED APR. 26, 1915.
1,166,969.
Patented Jan. 4, 1916.
2 SHEETS—SHEET 2.
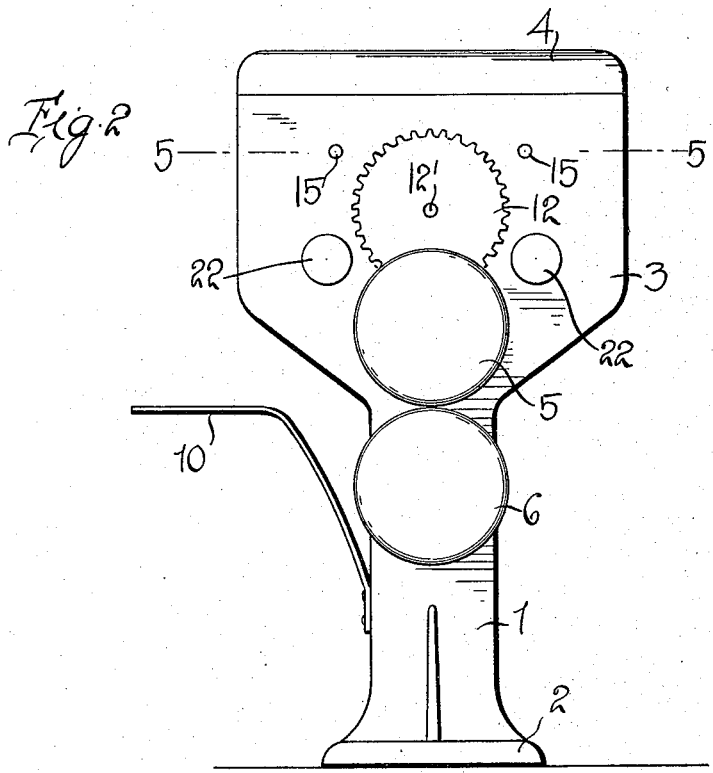
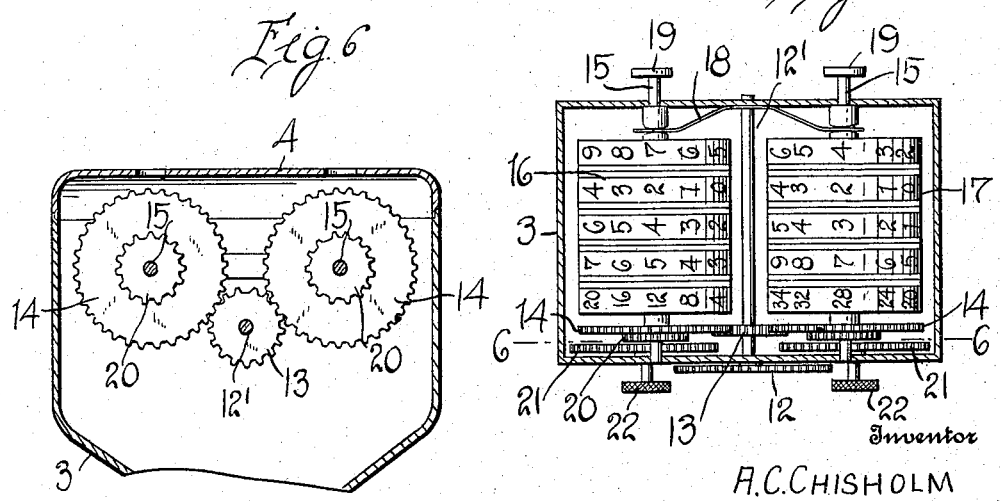
Inventor
A.C. CHISHOLM
By Watson E. Coleman
Attorney

UNITED STATES PATENT OFFICE.

ALEXANDER COLIN CHISHOLM, OF ANTIGONISH, NOVA SCOTIA, CANADA.

FABRIC-MEASURING DEVICE.

1,166,969.   Specification of Letters Patent.   Patented Jan. 4, 1916.

Application filed April 26, 1915. Serial No. 24,080.

*To all whom it may concern:*

Be it known that I, ALEXANDER C. CHISHOLM, a subject of the King of England, residing at Antigonish, in the Province of Nova Scotia, Dominion of Canada, have invented certain new and useful Improvements in Fabric-Measuring Devices, of which the following is a specification, reference being had to the accompanying drawings.

This invention comprehends certain new and useful improvements in devices for measuring cloth or other fabric and registering the number of inches and yards drawn from a roll, bolt, or the like, whereby the desired amount may be cut off with accuracy and all liability of accidentally giving an "overmeasure" is precluded, the device being designed particularly for use in dry goods stores, although it will be understood that the invention is of general application for measuring and registering purposes.

The invention has for its primary object a convenient, durable and efficient construction of device of this character, which may be mounted upon a counter or the like, and used with facility to accurately measure any predetermined or desired amount of cloth passed between the rollers with which the device is provided, improved means being provided whereby the cloth may be readily inserted in between the rollers, and improved means being provided whereby the desired amount of cloth will be measured and registered, the measuring and registering mechanism being of simple construction, not liable to get out of order, and capable of being readily reset. And the invention also aims to generally improve devices of this class so as to render them more useful and commercially desirable.

With these and other objects in view, as will more fully appear as the description proceeds, the invention consists in certain constructions, arrangements and combinations of the parts that I shall hereinafter more fully describe and claim.

For a full understanding of the invention, reference is to be had to the following description and accompanying drawings, in which—

Figure 1 is a side elevation of a measuring and registering device embodying the improvements of my invention. Fig. 2 is an end elevation thereof. Fig. 3 is a fragmentary end elevation with parts broken out to show the gear wheels. Fig. 4 is a fragmentary section on the line 4—4 of Fig. 3. Fig. 5 is a horizontal section on the line 5—5 of Fig. 2. Fig. 6 is a fragmentary section on the line 6—6 of Fig. 5.

Corresponding and like parts are referred to in the following description and designated in all of the views of the accompanying drawings by like reference characters.

Referring to the drawings, 1 designates a stand or pedestal provided with a base 2 designed to be secured by screws or other fastening devices, to a counter or the like, with one edge of the base preferably flush with the front of the counter, said pedestal being provided at its upper end with a casing 3 containing the measuring and registering mechanism, which latter is adapted to be covered and concealed from view by means of a cap 4 of any desired construction, said cap being formed with sight openings through which the dials or disks of the register may be viewed.

5 and 6 designate the feed rollers between which the cloth is adapted to be drawn, said rollers being disposed in substantially horizontal position and in superposed relation to each other. Preferably the rollers are covered with or formed of rubber or some other similar substance which will provide the necessary friction to insure that the rollers will be turned as the cloth is drawn between the same.

The lower roller 6 is carried by a shaft or spindle on which it is mounted to rotate about its longitudinal axis, said spindle being pivotally connected intermediate of its ends to the pedestal 1 and passing therethrough and being connected at one end with a handle portion 8. A contractile spring 9 is connected at one end to the handle portion 8 and at its other end to the pedestal, the tension of the spring being exerted upon the handle portion whereby the roller 6 will be normally held in contact with the superadjacent roller 5. 10 designates a shelf which is secured to one side of the pedestal 1 contiguous to these rollers, The roller 5 is movable about a fixed longitudinal axis and movable therewith is a spur pinion 11 which meshes with a gear wheel 12. The wheel 12 is mounted upon one end of a shaft 12' which also carries a spur pinion 13 mounted intermediate two gear wheels 14 and meshing with both of them. The wheels 14 are secured to shafts 15 which extend across the casing 3 in parallel relation with each other, and each of these shafts 15 carries any desired number of registering disks, one set being designated 16 and the other 17 to distinguish them from each other. The take-up or step by step mechanism which operatively connects the disks of each set, is not shown in the accompanying drawings, as it may be of any desired construction or design and its disclosure is not essential to a thorough understanding of this invention, but it will be understood from the foregoing that when the rollers 5 and 6 are turned by the drawing of the cloth between the same, the gear wheels 14 will be simultaneously operated, and the first disk in the series or set 16 will tell the number of inches of the cloth drawn through and when a yard has been reached the digit on the next disk will appear at the sight opening to indicate that one yard has been drawn off and so on, according to the amount required. At this point, I deem it advisable to add that one of these sets of disks is designed to register the number of inches and yards drawn off at each operation, while the other set, as for example, the disks 17, is intended to be cumulative and designates the number of yards and inches drawn off any predetermined period as, for example, during the course of a day's sales.

From as much of the description as has preceded in connection with the correlated views of the accompanying drawings, the operation of my improved cloth measuring device will be apparent. When it is desired to furnish the customer with any required amount of goods, it is only necessary for the merchant or clerk to pull upwardly upon the handle portion 8 of the roller 6 so as to move said roller away from the upper roller 5. The cloth is then inserted in between the rollers and the spring 9 permitted to act to draw the periphery of the roller 6 against the periphery of the roller 5, it being understood that the end of the cloth has been disposed flush with the end of the shelf 10. The end of the cloth which is thus passed in between the rollers 5 and 6 is then grasped and the cloth drawn through the rollers from left to right, whereupon through the pinions and gear wheels, hereinbefore described, the disks 16 and 17 will be turned and the desired amount registered. When the required number of yards or inches has been drawn through, the cloth is cut off at the edge of the shelf 10.

In order to provide means whereby the disks may be reset, the shafts 15 thereof are longitudinally movable in their bearings, and are held in normal position by a spring 18. Finger pieces or knobs 19 are secured to the corresponding ends of each shaft, and it is only necessary for the operator to press inwardly upon one of these finger pieces, whereupon the corresponding gear wheel 14 will be moved out of mesh with the pinion 13 and a further pushing in upon the knob 19 will cause the spur pinion 20 carried by the shaft 15 to mesh with a gear wheel 21 operable by means of a finger piece 22. While the pinion 20 and gear wheel 21 are held in mesh, it is only necessary for the operator to turn the finger piece 22 whereupon the disks 16 will be brought back to the zero point.

It will thus be seen that I have provided a very simple, durable and efficient construction of measuring and registering device which will be found a great convenience by proprietors of dry goods stores and the like, as well as by the clerks themselves and which will operate effectively to accurately determine the number of inches and yards drawn off from a roll, bolt or the like, so that the exact required amount may be cut off in every instance and all waste prevented, while at the same time the customer is assured of securing the amount called for.

While the accompanying drawings illustrate what I believe to be the preferred embodiment of my invention, it is to be understood that the invention is not limited thereto, but that various changes may be made in the construction, arrangements and proportions of the parts without departing from the scope of the invention as defined in the appended claim. It will also be seen that while I have illustrated my invention as applied to the measurement of dry goods drawn from a roll, bolt, or the like, the device may be also used with, adapted to, or applied in and as part of, machines for weaving cloths, printing wall paper, knitting carpet, etc., and, in fact, used in any position where it is desired to measure lengths of fabric.

What is claimed, is:

A device of the character described comprising a pedestal, a roller carried by the pedestal and projecting laterally therefrom, a registering mechanism carried by the pedestal and operatively engaged with the roller, a spindle pivotally engaged intermediate its length with the pedestal and disposed below the roller and in the same general direction as the roller, said spindle extending beyond opposite faces of the pedestal, a second roller loosely carried by the spindle and disposed below the first named roller, and a retractable member interposed between the pedestal at a point below the spindle and the opposite extremity of the spindle for normally maintaining the rollers in contact, said second extremity serving as a handle whereby the spindle may be moved relative to the first roller.

In testimony whereof I hereunto affix my signature in the presence of two witnesses.

ALEXANDER COLIN CHISHOLM.

Witnesses:
 MABEL M. ESSERY,
 JOSEPH A. WALL.

Copies of this patent may be obtained for five cents each, by addressing the "Commissioner of Patents, Washington, D. C."